(12) United States Patent
Blocksome et al.

(10) Patent No.: US 8,578,068 B2
(45) Date of Patent: Nov. 5, 2013

(54) METHOD OF DATA COMMUNICATIONS WITH REDUCED LATENCY

(75) Inventors: Michael A. Blocksome, Rochester, MN (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/947,520

(22) Filed: Nov. 16, 2010

(65) Prior Publication Data

US 2012/0124249 A1  May 17, 2012

(51) Int. Cl.
*G06F 3/00* (2006.01)
*G06F 15/167* (2006.01)

(52) U.S. Cl.
USPC ........................................... 710/22; 709/212

(58) Field of Classification Search
USPC ............................................................ 710/22
See application file for complete search history.

(56) References Cited

U.S. PATENT DOCUMENTS

| | | | | |
|---|---|---|---|---|
| 5,828,835 A * | 10/1998 | Isfeld et al. | ................... | 709/200 |
| 5,933,429 A * | 8/1999 | Bubenik et al. | ................ | 370/392 |
| 6,219,712 B1 * | 4/2001 | Mann et al. | ................... | 709/235 |
| 6,307,859 B1 * | 10/2001 | Tedenstig | ...................... | 370/401 |
| 2008/0270563 A1 * | 10/2008 | Blocksome et al. | .......... | 709/212 |

* cited by examiner

*Primary Examiner* — Henry W. H. Tsai
*Assistant Examiner* — Titus Wong
(74) *Attorney, Agent, or Firm* — Biggers & Ohanian, LLP

(57) ABSTRACT

Data communications with reduced latency, including: writing, by a producer, a descriptor and message data into at least two descriptor slots of a descriptor buffer, the descriptor buffer comprising allocated computer memory segmented into descriptor slots, each descriptor slot having a fixed size, the descriptor buffer having a header pointer that identifies a next descriptor slot to be processed by a DMA controller, the descriptor buffer having a tail pointer that identifies a descriptor slot for entry of a next descriptor in the descriptor buffer; recording, by the producer, in the descriptor a value signifying that message data has been written into descriptor slots; and setting, by the producer, in dependence upon the recorded value, a tail pointer to point to a next open descriptor slot.

18 Claims, 8 Drawing Sheets

METHOD OF DATA COMMUNICATIONS WITH REDUCED LATENCY

STATEMENT REGARDING FEDERALLY SPONSORED RESEARCH OR DEVELOPMENT

This invention was made with Government support under Contract No. B544331 awarded by the Department of Energy. The Government has certain rights in this invention.

BACKGROUND OF THE INVENTION

1. Field of the Invention

The field of the invention is data processing, or, more specifically, methods, apparatus, and products for data communications with reduced latency.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern parallel computers can include a plurality of nodes that communicate with each other via messages. In order to reduce to reduce the latency of such messages, different techniques have been used, each of which has various drawbacks. For example, a temporary buffer may be allocated to pack source buffers into a single contiguous buffer with messages for transmission. This technique, however, requires non-blocking callback in order to deallocate the temporary buffer. Alternatively, multiple source buffers may be packed into shadow buffers. This technique, however, requires separate buffers, resulting in poor memory efficiency and excessive memory allocation.

SUMMARY OF THE INVENTION

Methods, apparatus, and products for data communications with reduced latency, including: writing, by a producer, a descriptor and message data into at least two descriptor slots of a descriptor buffer, the descriptor buffer comprising allocated computer memory segmented into descriptor slots, each descriptor slot having a fixed size, the descriptor buffer having a header pointer that identifies a next descriptor slot to be processed by a DMA controller, the descriptor buffer having a tail pointer that identifies a descriptor slot for entry of a next descriptor in the descriptor buffer; recording, by the producer, in the descriptor a value signifying that message data has been written into descriptor slots; and setting, by the producer, in dependence upon the recorded value, a tail pointer to point to a next open descriptor slot.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
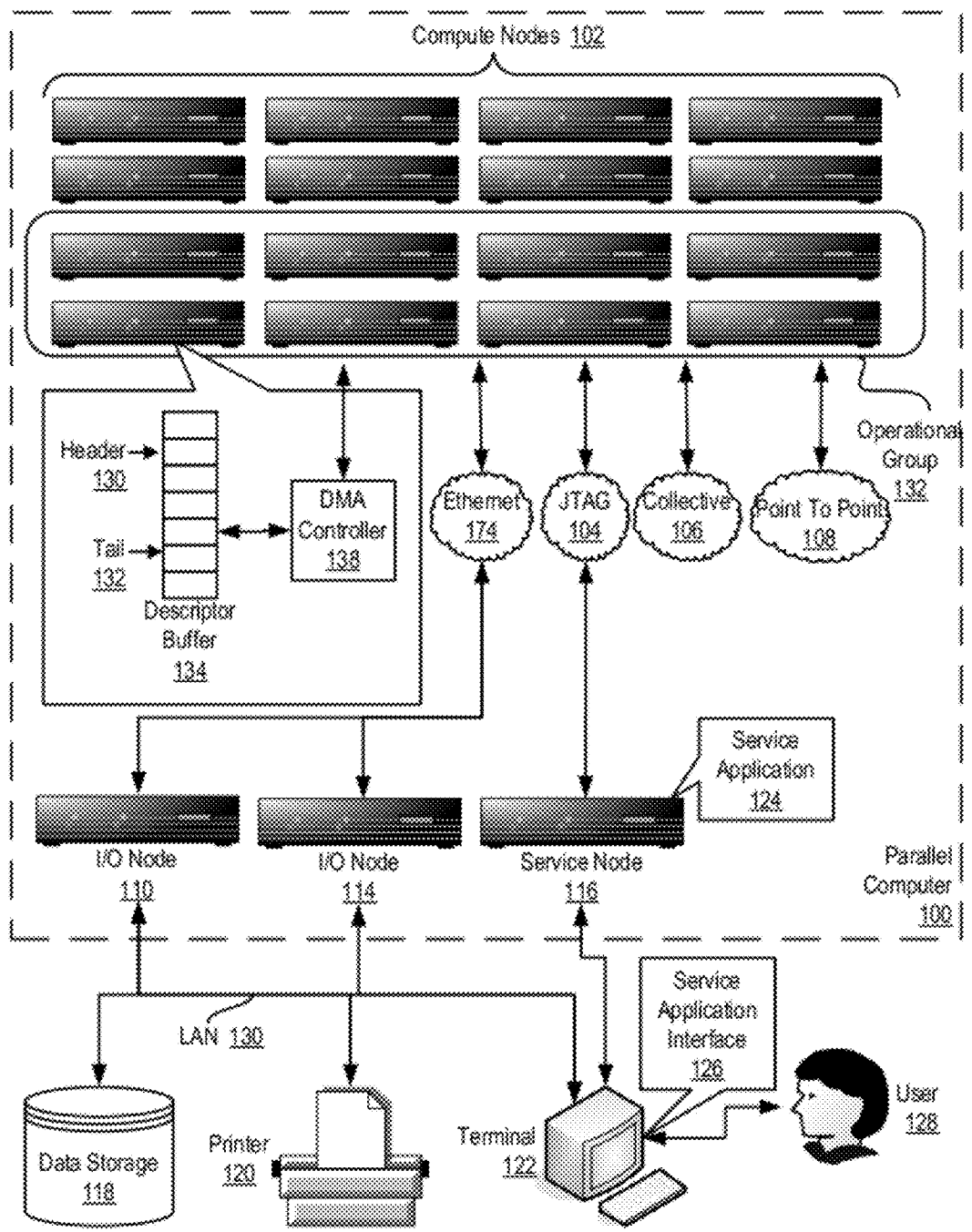
FIG. 1 sets forth example apparatus for data communications with reduced latency according to embodiments of the present invention.

Example methods, apparatus, and products for data communications with reduced latency in accordance with the present invention are described with reference to the accompanying drawings, beginning with FIG. 1. FIG. 1 sets forth example apparatus for data communications with reduced latency according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of a operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of a operational group. A 'reduce' operation is an example of a collective operation that executes arithmetic or logical functions on data distributed among the compute nodes of a operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The parallel computer (100) of FIG. 1 also includes a DMA controller (138). The DMA controller (138) is a module of automated computing machinery that includes DMA control logic that is implemented as hardware components and logic networks of the DMA controller (138), in firmware, as software operating an embedded controller, or as various combinations of software, firmware, or hardware. The DMA controller (138) of FIG. 1 operates a descriptor buffer (134). The descriptor buffer (134) of FIG. 1 is embodied as allocated computer memory segmented into descriptor slots having a fixed size. The descriptor buffer (134) of FIG. 1 stores descriptors that are consumed by the DMA controller (138) in carrying out data communications operations. In the example of FIG. 1, the descriptor is a data structure describing a data transfer operation to be performed. Each descriptor may include, for example, the identity of the recipient of a message, the identity of the sender of the message, the location of message data associated with the message, the size of such message data, and so on.

In the example of FIG. 1, a header pointer (130) identifies a next descriptor slot to be processed by the DMA controller (138). In the example of FIG. 1, a tail pointer (132) identifies a descriptor slot for entry of a next descriptor in the descriptor buffer (134). Because the header pointer (130) identifies a next descriptor slot to be processed by the DMA controller (138) and the tail pointer (132) identifies a descriptor slot for entry of a next descriptor in the descriptor buffer (134), descriptor slots that are between the header pointer (130) and the tail pointer (132) include descriptors or associated message data that has not been processed by the DMA controller (138) but has been inserted into the descriptor buffer (134) by a producer of data communications operations.

The parallel computer (100) of FIG. 1 carries out data communications with reduced latency according to embodiments of the present invention by recording in a descriptor a value signifying that message data has been written into descriptor slots. Such a value may be equal to, for example, the total number of descriptor slots into which a descriptor and message data associated with the descriptor were written into. In the example of FIG. 1, message data represents the payload of the message, which is the actual data to be transferred by a particular message. In an embodiment in which message data is written into the descriptor buffer (134), the descriptor buffer (134) therefore contains not only descriptors describing a data transfer operation to be performed, but the descriptor buffer (134) also includes the actual data to be transferred by the data transfer operation.

The parallel computer (100) of FIG. 1 carries out data communications with reduced latency according to embodiments of the present invention by setting, in dependence upon the recorded value, a tail pointer (132) to point to a next open descriptor slot in the descriptor buffer (134). In an example in which the recorded value is equal to the total number of descriptor slots into which a descriptor and message data associated with the descriptor were written into, the tail pointer (132) will be moved a number of descriptor slots that is equal to the recorded value. By moving the tail pointer (134) a number of descriptor slots that is equal to the recorded value, the tail pointer (134) is moved past the descriptor and message data that were inserted into the descriptor buffer (134), thereby pointing to the next open descriptor slot.

The arrangement of nodes, networks, and I/O devices making up the example apparatus illustrated in FIG. 1 are for explanation only, not for limitation of the present invention. Apparatus capable of data communications with reduced latency according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of data communications with reduced latency according to embodiments of the present invention sometimes include thousands of compute nodes. The example of FIG. 1 is illustrated with only one DMA controller (138) and only one descriptor buffer (134), but readers will recognize that in embodiments, many or even all of the compute nodes have a DMA controller and one or more descriptor buffers, so that a parallel computer (100) as a whole includes many DMA controllers and many descriptor buffers. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Data communications with reduced latency according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of data communications with reduced latency according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a front side bus (161) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. Application program (159) executes collective operations by calling software routines in parallel communications library (161). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
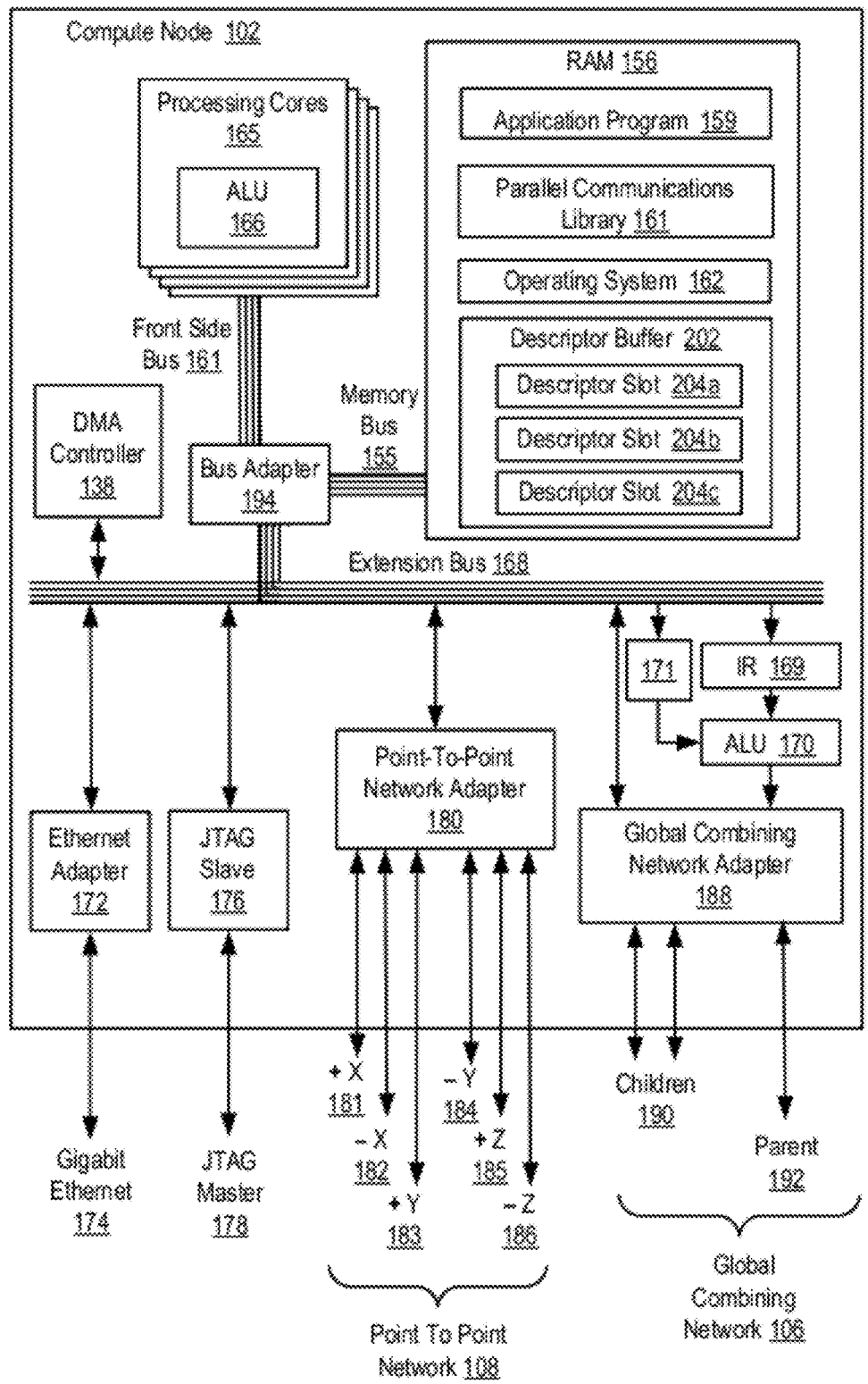
FIG. 2 sets forth a block diagram of an example compute node useful in a parallel computer capable of data communications with reduced latency according to embodiments of the present invention.

Also stored in RAM (156) is a descriptor buffer (202). In the example of FIG. 2, the descriptor buffer (202) may be embodied as computer memory for receiving a descriptor for a message and message data. The descriptor may include, for example, the identity of the recipient of a message, the identity of the sender of the message, the location of message data associated with the message, the size of such message data, and so on. The message data of FIG. 2 represents the payload of the message, which is the actual data to be transferred by a particular message. In the example of FIG. 2, the descriptor buffer (202) is embodied as allocated computer memory segmented into descriptor slots (204a, 204b, 204c). Each descriptor slot (204a, 204b, 204c) is a fixed size segment of memory for storing a single descriptor or an amount of message data that is less than or equal to the fixed size of the descriptor slot (204a, 204b, 204c).

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus for data communications with reduced latency include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes for data communications with reduced latency according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output.

The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

The compute node (102) of FIG. 2 includes a DMA controller (138) for processing descriptors and message data contained in the descriptor slots (204a, 204b, 204c) of the descriptor buffer (202). The DMA controller (138) is a module of automated computing machinery that includes DMA control logic that is implemented as hardware components and logic networks of the DMA controller (138), in firmware, as software operating an embedded controller, or as various combinations of software, firmware, or hardware.

Figure 3A:
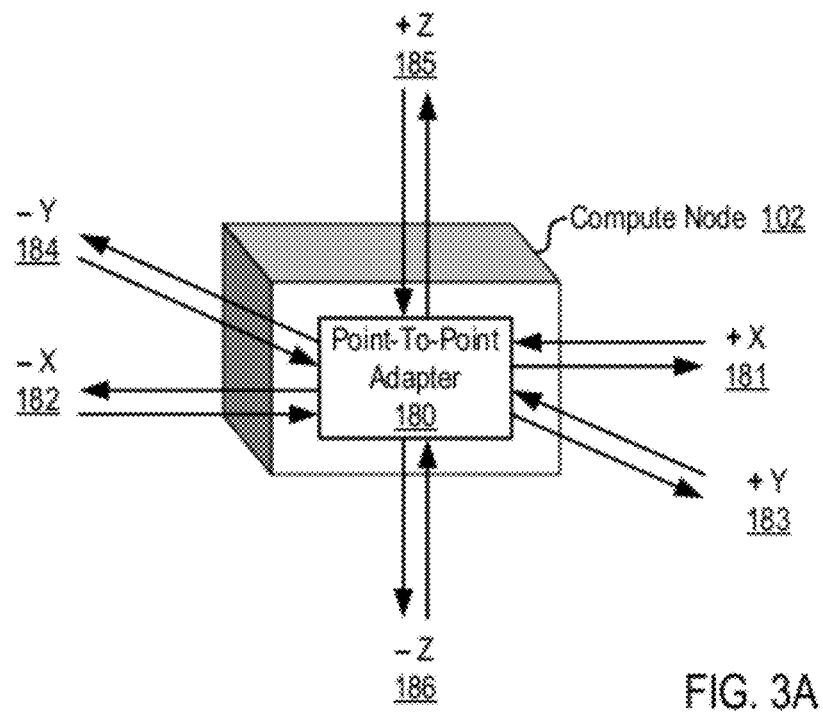
FIG. 3A sets forth a block diagram of an example Point-To-Point Adapter useful in systems for data communications with reduced latency according to embodiments of the present invention.

For further explanation, FIG. 3A sets forth a block diagram of an example Point-To-Point Adapter (180) useful in systems for data communications with reduced latency according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
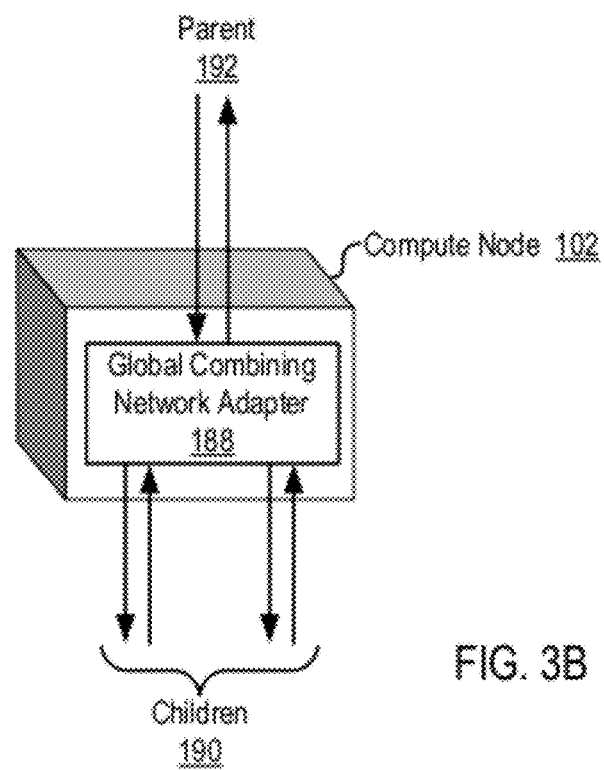
FIG. 3B sets forth a block diagram of an example Global Combining Network Adapter useful in systems for data communications with reduced latency according to embodiments of the present invention.

For further explanation, FIG. 3B sets forth a block diagram of an example Global Combining Network Adapter (188) useful in systems for data communications with reduced latency according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
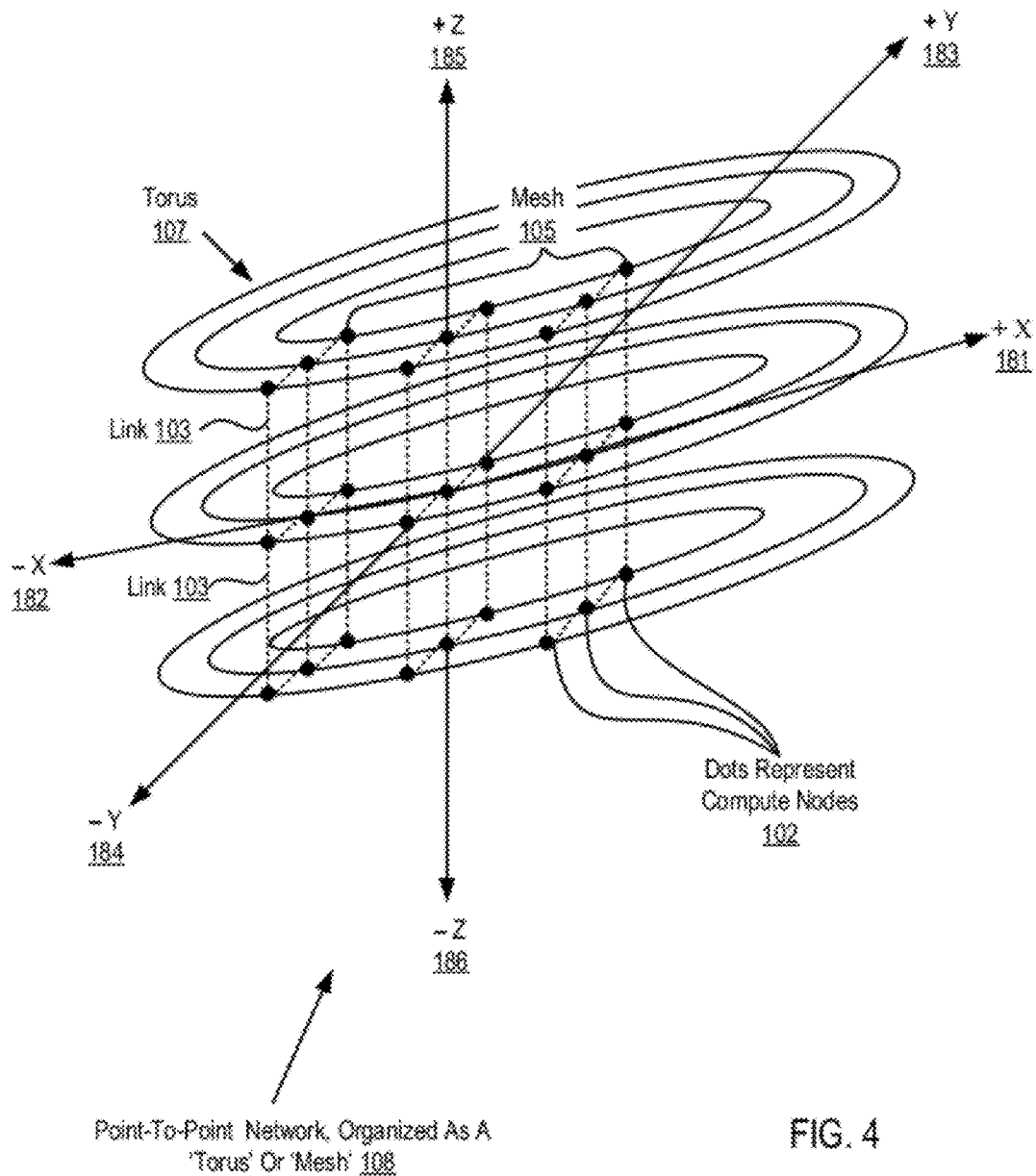
FIG. 4 sets forth a line drawing illustrating an example data communications network optimized for point-to-point operations useful in systems capable of data communications with reduced latency according to embodiments of the present invention.

For further explanation, FIG. 4 sets forth a line drawing illustrating an example data communications network (108) optimized for point-to-point operations useful in systems capable of data communications with reduced latency according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in data communications with reduced latency in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in data communications with reduced latency in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
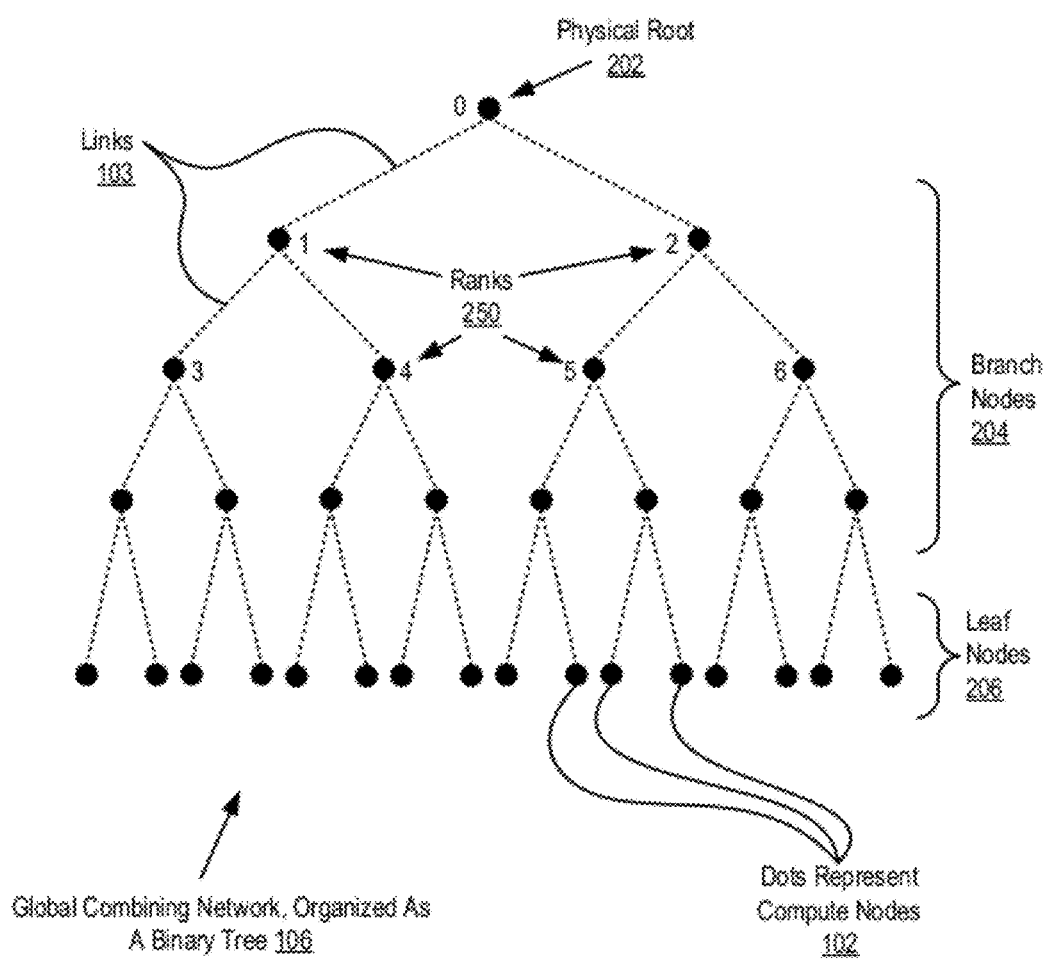
FIG. 5 sets forth a line drawing illustrating an example global combining network useful in systems capable of data communications with reduced latency according to embodiments of the present invention.

For further explanation, FIG. 5 sets forth a line drawing illustrating an example global combining network (106) useful in systems capable of data communications with reduced latency according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in data communications with reduced latency in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
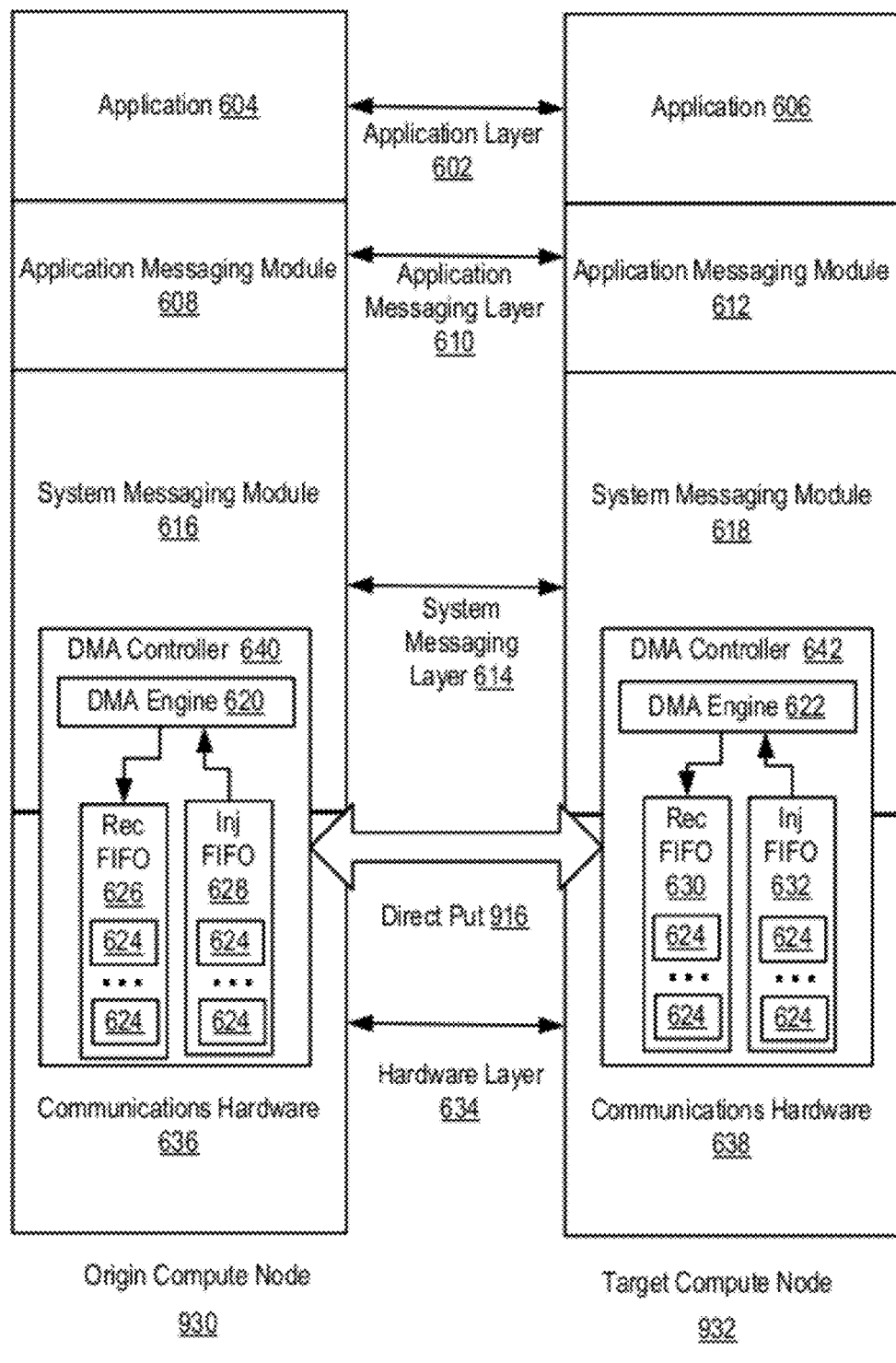
FIG. 6 sets forth a block diagram illustrating an example communications architecture illustrated as a protocol stack useful in data communications with reduced latency according to embodiments of the present invention.

For further explanation, FIG. 6 sets forth a block diagram illustrating an example communications architecture illustrated as a protocol stack useful in data communications with reduced latency according to embodiments of the present invention. The example communications architecture of FIG. 6 sets forth two compute nodes, origin compute node (930) and target compute node (932). Only two compute nodes are illustrated in the example of FIG. 6 for ease of explanation and not for limitation. In fact, data communications with reduced latency according to embodiments of the present invention may be implemented using many compute nodes in very large scale computer systems such as parallel computers with thousands of nodes.

The example communications architecture of FIG. 6 includes an application layer (602) that implements communications between applications (604, 606) running on the compute nodes (930, 932) by invoking functions in an application messaging module (608, 612) installed on each compute node (930, 932). Communications among the applications (604, 606) in the application layer (602) are effected through messages passed between applications. Applications may communicate messages invoking function of an application programming interface ('API') exposed by the application messaging modules (608, 612).

The example communications architecture of FIG. 6 includes a system messaging layer (614) that implements system specific protocols for communications that support messaging in the application layer (602) and the application messaging layer (610). Such system specific protocols are typically invoked through a set of APIs that are exposed to the application messaging modules (608, 612) in the application messaging layer (610). Such system specific protocols used for communications in the system messaging layer (614) are typically isolated from the application layer (610) making the application layer somewhat independent of system specific details.

The example communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (930, 932) on the physical network medium.

The example communications architecture of FIG. 6 illustrates a DMA controller (640) for the origin compute node (930) and a DMA controller (642) for a target compute node (932). The DMA controllers (640, 642) each are configured with DMA control logic in the form of a DMA engine (620, 622). The DMA engines (620, 622) can be implemented as hardware components and logic networks of a DMA controller (640, 642), in firmware, as software operating an embedded controller, as various combinations of software, firmware, or hardware, and so on.

The DMA engines (620, 622) in the example of FIG. 6 are illustrated in both the system messaging module layer (614) and the hardware layer (634). The DMA engines (620, 622) are shown in both the system messaging module layer (614) and the hardware layer (634) because DMA engines useful in data communications with reduced latency according to embodiments of the present invention often provide system messaging level interfaces and also implement communications according to some aspects of the hardware layer (634).

The example DMA engines (620, 622) of FIG. 6 each operate a reception fifo buffer (626, 630) that include data descriptors (624) for messages and data received from other DMA engines on other compute nodes through a memory fifo data transfer. The example DMA engines (620, 622) of FIG. 6 each also operate an injection fifo buffer (628, 632) that include data descriptors (624) for messages and data to be sent to other DMA engines on other compute nodes through a memory fifo data transfer. In the example of FIG. 6, the injection fifo buffer (628, 632) may be embodied as a descriptor buffer (202 of FIG. 2) with multiple descriptor slots (204a, 204b, 204c of FIG. 2) as illustrated in FIG. 2.

A memory fifo data transfer operation is a mode of transferring data using a DMA engine on an origin node and a DMA engine on a target node. In a memory fifo data transfer operation, data is transferred along with a data descriptor describing the data from an injection fifo for the origin DMA engine to a target DMA engine. The target DMA engine in turn places the descriptor in the reception fifo and caches the data. A core processor then retrieves the data descriptor from the reception fifo and processes the data in cache either by instructing the DMA to store the data directly or carrying out some processing on the data, such as even storing the data by the core processor.

Figure 7:
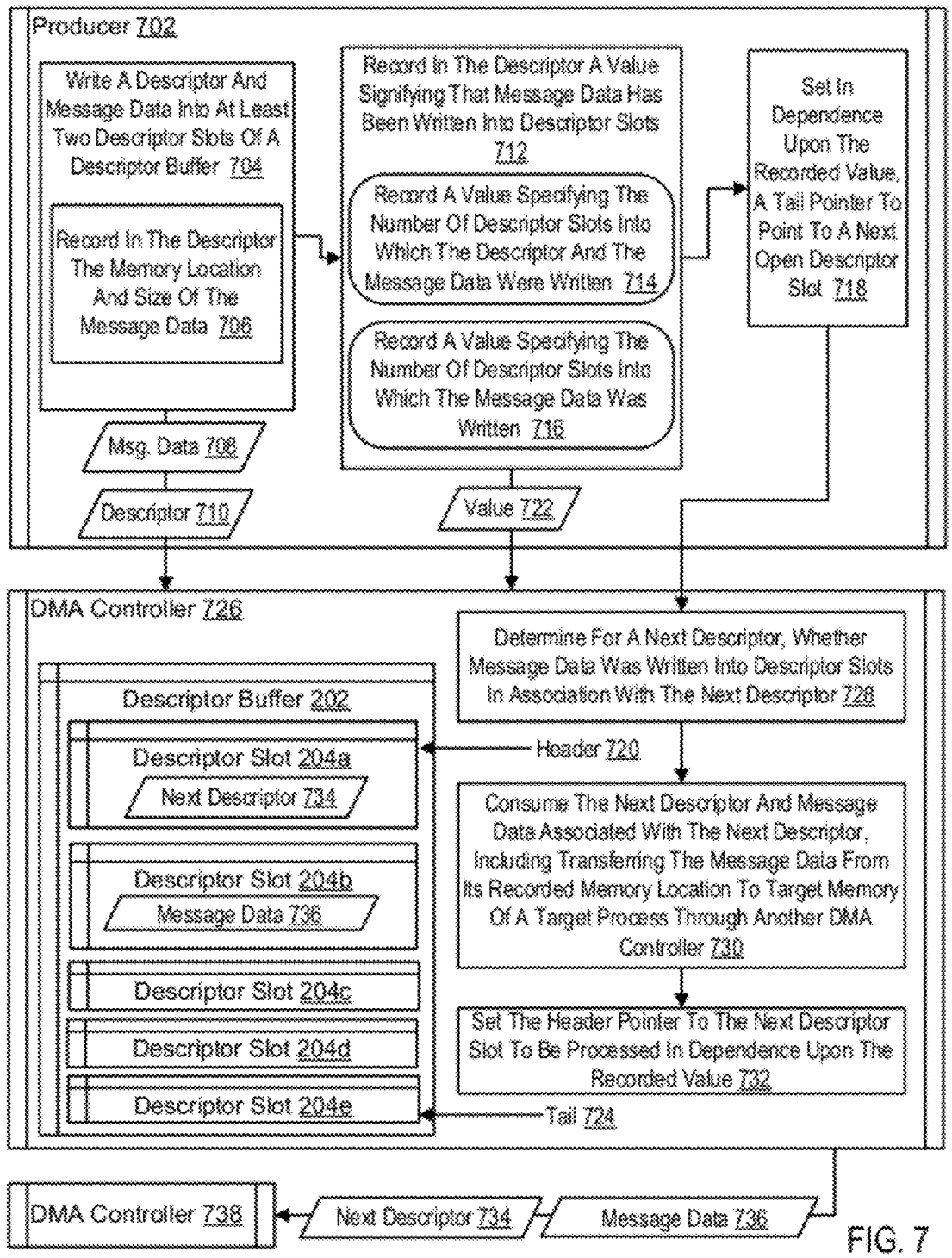
FIG. 7 sets forth a flow chart illustrating an example method for data communications with reduced latency according to embodiments of the present invention.

For further explanation, FIG. 7 sets forth a flow chart illustrating an example method for data communications with reduced latency according to embodiments of the present invention. The example of FIG. 7 includes writing (704), by a producer (702), a descriptor (710) and message data (708) into at least two descriptor slots (204c, 204d) of a descriptor buffer (202). In the example of FIG. 7, the producer (702) may be embodied, for example, as a process attempting to send a message and data associated with such a message to another process. Such a producer (702) can facilitate sending a message and data associated with such a message to another process by causing a descriptor (710) and message data (708) to be inserted into the descriptor buffer (202), where the descriptor (710) includes information identifying the target receipt, the sender, the location in memory of the message data (708), and so on.

In the example of FIG. 7, the descriptor buffer (202) is embodied as allocated computer memory segmented into descriptor slots (204a-204e) of a fixed size. In the example of FIG. 7, a header pointer (720) identifies a next descriptor slot (204a) to be processed by a DMA controller (726). In the example of FIG. 7, a tail pointer (724) identifies a descriptor slot (204e) for entry of a next descriptor (734) in the descriptor buffer (202). Because the header pointer (720) identifies a next descriptor slot (204a) to be processed by a DMA controller (726) and the tail pointer (724) identifies a descriptor slot (204e) for entry of a next descriptor (734) in the descriptor buffer (202), descriptor slots (204b) that are between the header pointer (720) and the tail pointer (724) include descriptors or associated message data that has not been processed by the DMA controller (726) but has been inserted into the descriptor buffer (202) by a producer (702).

In the example of FIG. 7, writing (704) a descriptor (710) and message data (708) into at least two descriptor slots (204c, 204d) of a descriptor buffer (202) includes recording (706) in the descriptor (710) the memory location and size of the message data (708). In the example of FIG. 7, the descriptor (710) is written into a single descriptor slot (204c). In the example of FIG. 7, however, the message data (708) may be written into multiple descriptor slots in dependence upon the size of the message data (708). If the size of the message data (708) is larger than the size of a descriptor slot, for example, the message data (708) may be split into multiple parts that are stored in a plurality of descriptor slots.

In the example of FIG. 7, recording (706) in the descriptor (710) the memory location and size of the message data (708) may be carried out, for example, by populating a predetermined field in the descriptor (710) with a beginning memory address of the message data (708) and also populating a predetermined field in the descriptor (710) with the size of the message data (708). The address of the message data may be embodied as, for example, a virtual address, a real address in memory, a descriptor slot index in the descriptor buffer (202), and in other ways as will occur to those of skill in the art. The size of the message data (708) may be embodied as, for example, an amount of memory expressed in kilobytes, a number of descriptor slots in the descriptor buffer (202) that contained the message data (708), and so on.

The example of FIG. 7 also includes recording (712), by the producer (702), in the descriptor (710) a value (722) signifying that message data (708) has been written into the descriptor slots (204d). The value (722) signifying that message data (708) has been written into the descriptor slots (204d) may be embodied as, for example, an integer value used as a flag such that a value of 0 indicates that message data (708) has not been written into the descriptor slots (204d) and a value of 1 indicates that message data (708) has been written into the descriptor slots (204d). Such a value (722) may be recorded in a predefined field of the descriptor (710) that is used for determining whether the descriptor (710) is associated with message data (708) that is also stored in the descriptor buffer (202).

In the example of FIG. 7, recording (712) in the descriptor (710) a value (722) signifying that message data (708) has been written into the descriptor slots (204d) can include recording (714) a value (722) specifying the number of descriptor slots (204c, 204d) into which the descriptor (710) and the message data (708) were written. In such an embodiment, the value (722) specifying the number of descriptor slots (204c, 204d) into which the descriptor (710) and the message data (708) were written will be at least 1 given that the descriptor (710) was written into the descriptor buffer (202). If message data (708) associated with the descriptor (710) was written into the descriptor buffer (202), the value (722) will be at least 2 as one descriptor slot (204c) will include the descriptor (710) and at least one additional descriptor slot (204d) will include the message data (708). Such a value (722) may be recorded in a predefined field of the descriptor (710) that is used for determining whether the descriptor (710) is associated with message data (708) that is also stored in the descriptor buffer (202) and, if message data (708) is stored in the descriptor buffer (202), the number of descriptor slots that include such message data (708).

In the example of FIG. 7, recording (712) in the descriptor (710) a value (722) signifying that message data (708) has been written into the descriptor slots (204d) can alternatively include recording (716) a value (722) specifying the number of descriptor slots (204d) into which the message data (708) was written. In such an embodiment, if message data (708) associated with the descriptor (710) was written into the descriptor buffer (202), the value (722) will be at least 1 as at least one descriptor slot (204d) will include the message data (708). Such a value (722) may be recorded in a predefined field of the descriptor (710) that is used for determining whether the descriptor (710) is associated with message data (708) that is also stored in the descriptor buffer (202) and, if message data (708) is stored in the descriptor buffer (202), the number of descriptor slots that include such message data (708).

The example of FIG. 7 also includes setting (718), by the producer (702), in dependence upon the recorded value (722), a tail pointer (724) to point to a next open descriptor slot (204e). In the example of FIG. 7, a next open descriptor slot (204e) is a descriptor slot that does not include a descriptor or message data that has not yet been processed. The next open descriptor slot (204e) represents the descriptor slot in the descriptor buffer (202) that should be populated with a descriptor or message data from the producer (702).

The example of FIG. 7 also includes determining (728), by the DMA controller (726), for the next descriptor (734), whether message data (736) was written into descriptor slots (204b) in association with the next descriptor (734). In the example of FIG. 7, determining (728) whether message data (736) was written into descriptor slots in association with the next descriptor (734) may be carried out, for example, by inspecting a predetermined field in next descriptor (734) that is used to specify the number of descriptor slots into which the next descriptor (734) was written, the number of descriptor slots into which the message data (736) was written, or any combination thereof. In an embodiment in which a predetermined field in the next descriptor (734) is used to specify the number of descriptor slots into which the message data (736) was written, a value of 1 or greater would indicate that message data was written into the descriptor buffer (202). In an embodiment in which a predetermined field in the next descriptor (734) is used to specify the number of descriptor slots into which the next descriptor (734) and the message data (736) was written, a value of 2 or greater would indicate that message data was written into the descriptor buffer (202).

The example of FIG. 7 also includes consuming (730), by the DMA controller (726), a next descriptor (734) and message data (736) associated with the next descriptor (734), including transferring the message data (736) from its recorded memory location to target memory of a target process through another DMA controller (738). In the example of FIG. 7, the DMA controller (726) may consumer the next descriptor (734) and message data (736), for example, by using the next descriptor (734) to identify the memory location and size of the message data (736) and transferring the message data (736) to memory that serves as a shared memory segment with the other DMA controller (738). The other DMA controller (738) may thereafter transfer the message data (736) to target memory of a target process that is to receive and process the message data (736).

The example of FIG. 7 also includes setting (732), by the DMA controller (726), the header pointer (720) to the next descriptor slot (204c) to be processed in dependence upon the recorded value (722). In the example of FIG. 7, the next descriptor (734) to be processed is in descriptor slot (204a) and the message data (736) associated with the next descriptor (734) is in descriptor slot (204b). In an embodiment in which the recorded value (722) represents the number of descriptor slots into which a descriptor and message data were written, the recorded value (722) would be 2 and the header pointer (720) would therefore be moved 2 spots such that the header pointer (720) points to descriptor slot (204c). In an embodiment in which the recorded value (722) represents the number of descriptor slots into which only the message data was written, the recorded value (722) would be 1 and the header pointer (720) would therefore be moved 1 descriptor slot to account for the descriptor (734) and 1 descriptor slot based on the recorded value (722), such that the header pointer (720) points to descriptor slot (204c).

Figure 8:
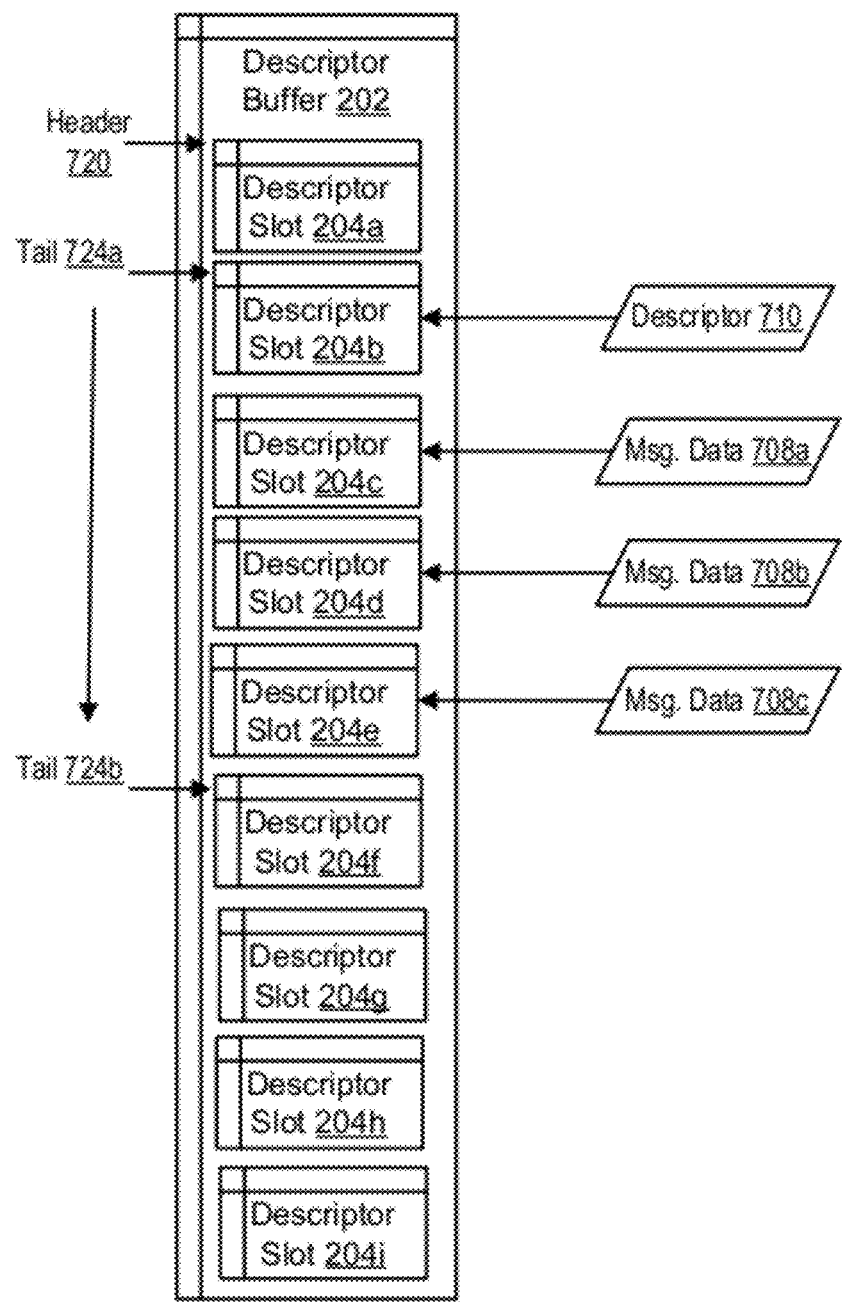
FIG. 8 sets forth a block diagram illustrating an example descriptor buffer useful in data communications with reduced latency according to embodiments of the present invention.

FIG. 8 sets forth a block diagram illustrating an example descriptor buffer (202) useful in data communications with reduced latency according to embodiments of the present invention. The example descriptor buffer (202) is similar to the descriptor buffers described above with reference to FIGS. 2 and 7, as the descriptor buffer (202) includes a plurality of descriptor slots (204a-204i). In the example of FIG. 8, the header pointer (720) points to descriptor slot (204a), indicating that descriptor slot (204a) is the next descriptor slot to be processed. In the example of FIG. 8, the tail pointer (724a) initially points to descriptor slot (204b), indicating that descriptor slot (204b) is the next open descriptor slot into which the next received descriptor or next received message data should be inserted.

The example of FIG. 8 illustrates an embodiment in which a descriptor (710) is inserted into the descriptor buffer (202) along with message data (708a, 708b, 708c) that is associated with the descriptor (710). In the example of FIG. 8, the message data may be distributed across multiple descriptor slots (204c, 204d, 204e), for example, because the total size of data to be sent in a message associated with the descriptor (710) is of a size such that three descriptor slots (204c, 204d, 204e) are required to store all of the message data. In such an example, inserting the descriptor (710) and the message data (708a, 708b, 708c) into the descriptor slots (204b, 204c, 204d, 204e) causes the tail pointer (724a) to be modified such that the modified tail pointer (724b) points to descriptor slot (204f), thereby indicating that descriptor slot (204f) is the next open descriptor slot.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data communications with reduced latency, the method comprising:
   writing, by a producer, a descriptor and message data into at least two descriptor slots of a descriptor buffer, the descriptor buffer comprising allocated computer memory segmented into descriptor slots, each descriptor slot having a fixed size, the descriptor buffer having a header pointer that identifies a next descriptor slot to be processed by a DMA controller, the descriptor buffer having a tail pointer that identifies a descriptor slot for entry of a next descriptor in the descriptor buffer;
   recording, by the producer, in the descriptor a value signifying that message data has been written into descriptor slots; and
   setting, by the producer, in dependence upon the recorded value, a tail pointer to point to a next open descriptor slot.

2. The method of claim 1 wherein recording a value further comprises recording a value specifying the number of descriptor slots into which the descriptor and the message data were written.

3. The method of claim 1 wherein recording a value further comprises recording a value specifying the number of descriptor slots into which the message data was written.

4. The method of claim 1 wherein writing the descriptor further comprises recording in the descriptor the memory location and size of the message data.

5. The method of claim 1 further comprising determining, by the DMA controller, for a next descriptor, whether message data was written into descriptor slots in association with the next descriptor.

6. The method of claim 1 wherein writing the descriptor further comprises recording in the descriptor the memory location and size of the message data and the method further comprises:
   consuming, by the DMA controller, a next descriptor and message data associated with the next descriptor, including transferring the message data from its recorded memory location to target memory of a target process through another DMA controller; and
   setting, by the DMA controller, the header pointer to the next descriptor slot to be processed in dependence upon the recorded value.

7. Apparatus for data communications with reduced latency, the apparatus comprising a computer processor, a computer memory operatively coupled to the computer processor, the computer memory having disposed within it computer program instructions that, when executed by the computer processor, cause the apparatus to carry out the steps of:
   writing, by a producer, a descriptor and message data into at least two descriptor slots of a descriptor buffer, the descriptor buffer comprising allocated computer memory segmented into descriptor slots, each descriptor slot having a fixed size, the descriptor buffer having a header pointer that identifies a next descriptor slot to be processed by a DMA controller, the descriptor buffer having a tail pointer that identifies a descriptor slot for entry of a next descriptor in the descriptor buffer;
   recording, by the producer, in the descriptor a value signifying that message data has been written into descriptor slots; and
   setting, by the producer, in dependence upon the recorded value, a tail pointer to point to a next open descriptor slot.

8. The apparatus of claim 7 wherein recording a value further comprises recording a value specifying the number of descriptor slots into which the descriptor and the message data were written.

9. The apparatus of claim 7 wherein recording a value further comprises recording a value specifying the number of descriptor slots into which the message data was written.

10. The apparatus of claim 7 wherein writing the descriptor further comprises recording in the descriptor the memory location and size of the message data.

11. The apparatus of claim 7 wherein further comprising computer program instructions that, when executed by the computer processor, cause the apparatus to carry out the step of determining, by the DMA controller, for a next descriptor, whether message data was written into descriptor slots in association with the next descriptor.

12. The apparatus of claim 7 wherein writing the descriptor further comprises recording in the descriptor the memory location and size of the message data and the apparatus includes computer program instructions that, when executed by the computer processor, cause the apparatus to carry out the steps of:

consuming, by the DMA controller, a next descriptor and message data associated with the next descriptor, including transferring the message data from its recorded memory location to target memory of a target process through another DMA controller; and setting, by the DMA controller, the header pointer to the next descriptor slot to be processed in dependence upon the recorded value.

13. A computer program product for data communications with reduced latency, the computer program product stored on a computer memory, the computer program product comprising computer program instructions that, when executed, cause a computer to carry out the steps of: writing, by a producer, a descriptor and message data into at least two descriptor slots of a descriptor buffer, the descriptor buffer comprising allocated computer memory segmented into descriptor slots, each descriptor slot having a fixed size, the descriptor buffer having a header pointer that identifies a next descriptor slot to be processed by a DMA controller, the descriptor buffer having a tail pointer that identifies a descriptor slot for entry of a next descriptor in the descriptor buffer; recording, by the producer, in the descriptor a value signifying that message data has been written into descriptor slots; and setting, by the producer, in dependence upon the recorded value, a tail pointer to point to a next open descriptor slot.

14. The computer program product of claim 13 wherein recording a value further comprises recording a value specifying the number of descriptor slots into which the descriptor and the message data were written.

15. The computer program product of claim 13 wherein recording a value further comprises recording a value specifying the number of descriptor slots into which the message data was written.

16. The computer program product of claim 13 wherein writing the descriptor further comprises recording in the descriptor the memory location and size of the message data.

17. The computer program product of claim 13 further comprising computer program instructions that, when executed, cause the computer to carry out the step of determining, by the DMA controller, for a next descriptor, whether message data was written into descriptor slots in association with the next descriptor.

18. The computer program product of claim 13 wherein writing the descriptor further comprises recording in the descriptor the memory location and size of the message data and the computer program product includes comprising computer program instructions that, when executed, cause the computer to carry out the steps of:

consuming, by the DMA controller, a next descriptor and message data associated with the next descriptor, including transferring the message data from its recorded memory location to target memory of a target process through another DMA controller; and setting, by the DMA controller, the header pointer to the next descriptor slot to be processed in dependence upon the recorded value.

* * * * *